United States Patent [19]

Lin

[11] Patent Number: 5,966,307
[45] Date of Patent: Oct. 12, 1999

[54] LASER MARKER CONTROL SYSTEM

[75] Inventor: Don Lin, Chung Li, Taiwan

[73] Assignee: Behavior Tech Computer Corporation, Taipei, Taiwan

[21] Appl. No.: 08/926,934

[22] Filed: Jun. 10, 1997

[51] Int. Cl.⁶ ............... G06F 19/00; G06G 7/66
[52] U.S. Cl. ............. 364/474.01; 33/12; 33/13; 33/666; 33/667; 156/60; 156/62; 358/299
[58] Field of Search .......... 364/474.01; 33/666, 33/677, 12, 13, 501, 574, 21.4, 21.1; 156/60, 62; 358/299

[56] References Cited

U.S. PATENT DOCUMENTS

| | | | |
|---|---|---|---|
| 3,803,379 | 4/1974 | McRay | 219/121.6 |
| 3,892,488 | 7/1975 | Edmonds | 356/153 |
| 4,039,823 | 8/1977 | Jovanovic et al. | 395/245 |
| 4,156,124 | 5/1979 | Macken et al. | 219/121.68 |
| 4,430,548 | 2/1984 | Macken | 219/121.67 |
| 4,456,811 | 6/1984 | Hella et al. | 219/121.85 |
| 4,458,133 | 7/1984 | Macken | 219/121.67 |
| 4,947,022 | 8/1990 | Ostroff et al. | 219/121.68 |
| 4,972,323 | 11/1990 | Cauwet | 364/474.29 |
| 5,270,627 | 12/1993 | Rehse | 318/575 |
| 5,609,780 | 3/1997 | Freedenberg et al. | 219/121.73 |
| 5,817,243 | 10/1998 | Shaffer | 216/65 |
| 5,829,152 | 11/1998 | Potter et al. | 216/65 |
| 5,838,361 | 11/1998 | Corbett | 347/262 |
| 5,856,649 | 1/1999 | Yamazaki et al. | 219/121.67 |

Primary Examiner—William Grant
Assistant Examiner—McDieunel Marc
Attorney, Agent, or Firm—Rosenberg, Klein & Bilker

[57] ABSTRACT

A laser marker control system includes a personal computer, a programmable logic control (PLC), a movable carrier table, an industrial man-machine interface and a laser device. The personal computer is linked to the PLC to control the laser device and is linked to the carrier table in a point-teaching operation. The PLC is provided for numeral calculation, signal input, status output and control of the carrier table, and provides signal, data and status exchange when linked to the man-machine interface. The carrier table is the carrier of the work piece, controlled by the PLC to change the position thereof. In the point-teaching operation, the carrier table is linked to the personal computer and the PLC. The man-machine interface is a touch-control monitor for status display and may indirectly control the carrier table when linked to the PLC. The laser device which generates and emits a laser beam for marking operation is connected to the PLC. The laser device is linked to the carrier table in the point-teaching operation. The control system of the present invention may be used to replace the manual control and may "learn" to perform marking operation on work pieces of different specification by means of the point-teaching operation which collects and stores related data of the work pieces so as that the system may form desired characters/marks on the work piece precisely and efficiently by means of the laser beam in an automatic manner.

5 Claims, 7 Drawing Sheets

LASER MARKER CONTROL SYSTEM

FIELD OF THE INVENTION

The present invention relates to a laser marking device and in particular to an automatic control system which incorporates a programmable logic control (PLC) and a personal computer to control operation of a carrier table in order to automatically perform laser marking operation on work pieces. In addition, the present invention also relates to a control system which is capable to memorize related data of work pieces of different specifications through point teaching operation so as to allow automatic laser marking operations on work pieces of different specifications to improve the precision of the marking operation and enhance the marking efficiency.

BACKGROUND OF THE INVENTION

Characters or marks that are shown on the outer surfaces of industrial products are subject to contacts of human hands so that they fade very quickly, thus reducing their service lives. A common example of such a problem is computer keyboards which comprises a number of movable keys or blocks or pushbuttons each having a particular character or mark provided thereon for indication distinction purposes. To solve the quick fading problem of the characters or marks on industrial products, a laser marker is adapted to form characters or marks on the industrial products, such as the computer keyboards, by means of a laser beam etching or engraving surfaces of the products. The characters or marks so formed are in general recessed with respect to the surface on which they are formed so as to prevent the characters or marks from abrasion and fading.

Conventionally, the laser marker that is used to mark the key blocks of the keyboard comprises a work piece carrier table and a laser device controlled by a computer. In operation, "blank" keyboards are manually positioned by an operator in a one by one fashion onto the carrier table that is located below the laser device and then the operator uses the laser device to mark the blank keyboard. The keyboard hat is so processed is then manually moved away. This completes the character marking operation of the keyboard.

Such a conventional laser character marker has some evident drawbacks and is quite impractical. For example, the operator has to watch the computer that controls the laser device and the related parameter settings of the laser. The operator also needs to be careful about the position and orient the keyboard in the carrier table and has to move the keyboards so processed to a collection shelf one by one after the marking operation. This is quite inconvenient in operation and the precision of the marking operation is subject to influence of human factor. Accident may occur to physically damage the operator in positioning the keyboard into the laser marker or removal of the keyboard therefrom due to for example injury caused by the laser beam. Further, the manual operation makes it difficult to enhance the character marking operation efficiency. In addition, for keyboards of different specifications, the locations of the key blocks that are to be processed by the character marking operation may on the keyboard may be different from keyboard to keyboard so that the difference in the specifications of the keyboards requires the carrier table to be moved in different ways and automation of both marking operation on the work pieces of different specification and forming characters of different styles on the keyboards is in general impossible. Thus, it is not possible to increase the manufacturing efficiency of the keyboards and the cost cannot be cut down.

It is thus desirable to have a control system for the laser marker which overcomes the drawbacks encountered in the conventional laser marker systems.

SUMMARY AND OBJECTS OF THE INVENTION

Therefore, in order to solve the problems mentioned above, the present invention provides a laser marker control system which makes use of a programmable logic control (PLC) and a personal computer to control the operation of the carrier table which serves as the carrier of the keyboard to be processed so as to allow the laser beam from a laser device to project toward and perform precise marking operation on the keyboard work pieces supported on the carrier table in an automatic and non-stopped manner to reduces the work stations, cut down human labor cost, improve the precision of marking on the products and increase efficiency.

Thus, an object of the present invention is to provide a laser marker control system, comprising a personal computer, a programmable logic control (PLC), a movable keyboard carrier table, an industrial man-machine interface and a laser device. The components and elements of the system are suitably inter-connected with each other so as to allow the carrier table which serves as the carrier of the keyboards to pick up the keyboards one by one and position the keyboard so picked up on a keyboard support tray located under the laser device in order to precisely and efficiently form desired characters/marks on the keyboard with the laser beam from the laser device and then pick up and position the keyboard into a keyboard collection shelf.

In accordance with the present invention, the personal computer and the PLC are connected together to control the laser device. The PLC is provided for numeral calculation, signal input, status output and control of the carrier table and provides signal, data and status exchange when linked to the man-machine interface. The carrier table is the carrier of the work piece to be processed, controlled by the PLC to change the position thereof. The man-machine interface is a touch-control monitor for status display and may indirectly control the carrier table when linked to the PLC. The laser device which generates and emits a laser beam for marking operation is connected to the PLC. The control system of the present invention is to replace the conventional manual control for performing laser marking operation on different work pieces in a more efficient and precise manner.

Another object of the present invention is to provide a laser marker control system which is capable to carry out point-teaching learning process that allows an operator to perform a manual operation on one work piece of different specification first and the PLC which incorporates software to control the carrier table "learns" the process of the marking operation and collect and store the related data in the computer. Thus, an automatic marking operation may be performed on the work pieces of that specification in accordance with the data so collected which standardizes and unifies the marking operation and enhances the product quality.

Further in accordance with the present invention, by means of the point-teaching process, the control system in accordance with the present invention allows the marker to automatically perform marking operation on all kinds of different work pieces to be processed to form desired characters/marks on the work pieces.

BRIEF DESCRIPTION OF THE DRAWINGS

To have the present invention more fully understood, a detailed description of the preferred embodiment of the present invention is given as follows, with reference to the accompanying drawings, wherein.

DETAILED DESCRIPTION OF THE PREFERRED EMBODIMENT

Figure 1:
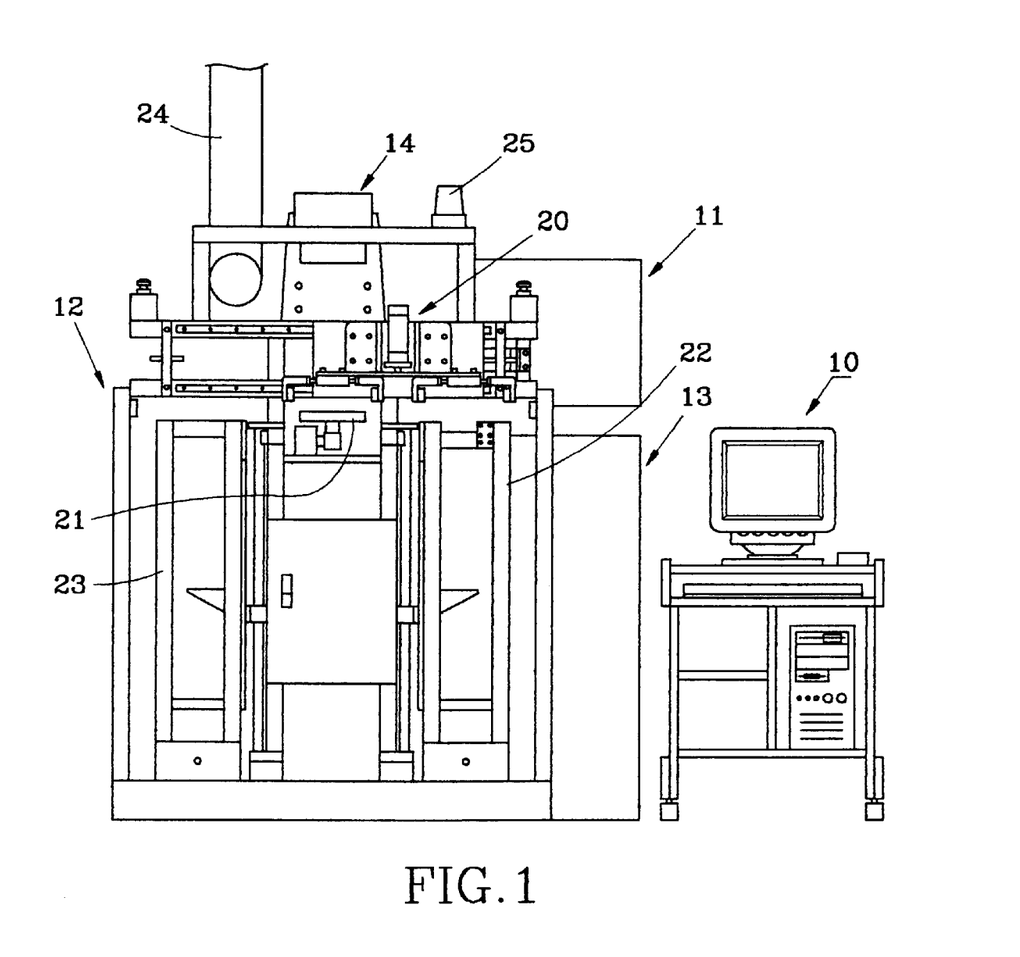
FIG. 1 is a front view showing a work station of a marking control system in accordance with the present invention.
Figure 2:
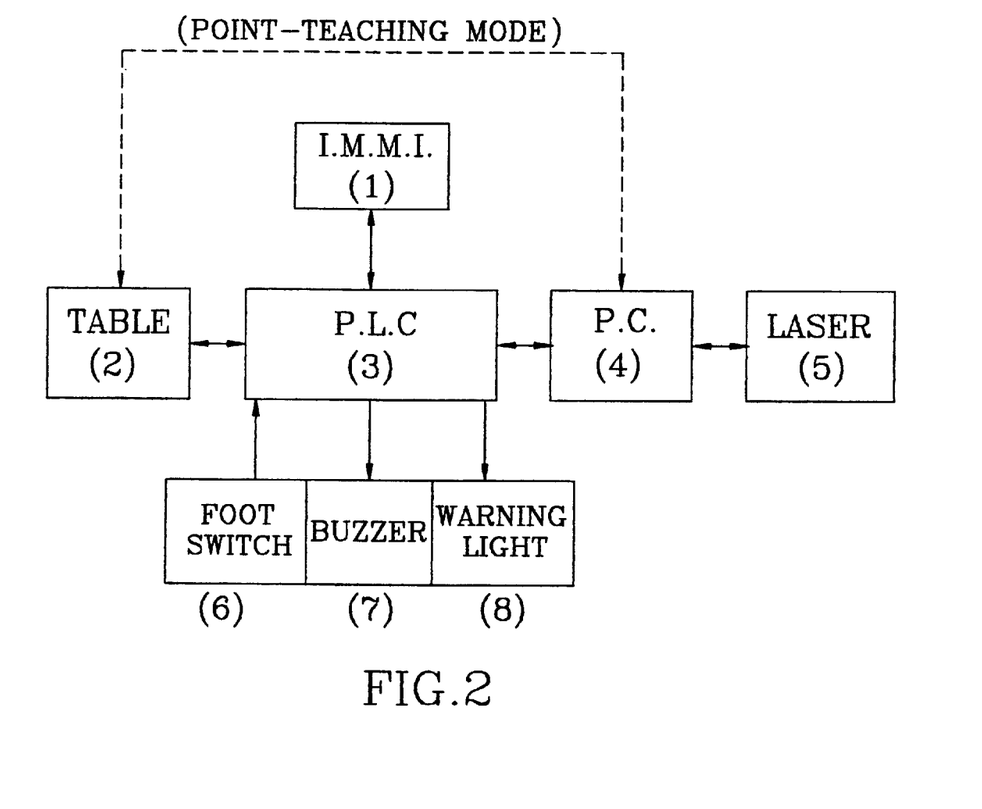
FIG. 2 is a block diagram of the marking control system in accordance with the present invention.

With reference to the drawings and in particular to FIG. 2, wherein a system block diagram of a laser marker control system in accordance with the present invention is shown, the laser marker control system of the present invention comprises a personal computer 10, a programmable logic controller (PLC) 11, a carrier table 12, an industrial man-machine interface (IMMI) 13, and a laser device 14, which are constructed and connected to form a marking control system work station as shown in FIG. 1.

As shown in FIGS. 1 and 2, the personal computer 10 is linked to the PLC 11 for controlling the laser device 14 and is linked to the carrier table 12 in a point-teaching operation. The PLC 11 performs numerical calculation, signal input, status output and control of the carrier table 12 and, when linked to the man-machine interface 13, performs exchange of signal, data and status therewith.

The carrier table 12 which serves as a carrier of a work piece (as shown in FIG. 1) to be processed is controlled by the PLC 11 in order to move a work piece support tray 21 provided on the carrier table 12. The carrier table 12 is linkable to the personal computer 10 and the PLC 11 in the point-teaching operation so as to allow the system to "learn" and "memorize" related data. The man-machine interface 13 is a touch-control type monitor for display of status and indirectly controls the carrier table 12 when linked with the PLC 11. The laser device 14 which generates and emits a laser beam for performing marking operation is linked to the PLC 11 and is linkable to the carrier table 12 in the point-teaching operation. The control system of the present invention is further provided with a foot operated switch (not shown in FIG. 1) for signal input purpose. Also, a buzzer and a warning light 25 are connected to the system for providing warning signal of the system status.

As shown in FIG. 1, in the preferred embodiment of the present invention, the carrier table 12 which serves as the carrier of the work piece to be processed comprises a grasping mechanism 20, the work piece support tray 21, a work piece supply shelf 22 and a work piece collection shelf 23. The personal computer 10 may be arranged at one side of the carrier table 12 based on the need of the operation. The PLC 11 may be mounted behind one side of the carrier table 12. The laser device 14 is arranged at the top of the carrier table 12, facing the work piece support tray 21 that is disposed at the bottom side to project a laser beam toward the work piece to be processed (not shown in the drawing) positioned in the work piece support tray 21. The buzzer and the warning light 25 are arranged at suitable locations on the carrier table 12. A ventilation tube 24 is arranged on one side of the laser device 14. The ventilation tube 24 has an inlet opening opposing the space between the laser device 14 and the work piece support tray 21 in order to remove waste gas generated in the laser marking operation caused by the laser beam acting on the work piece.

The carrier table 12 is controlled by the PLC 11 to operate, driving the grasping device 20 to move between the work piece supply shelf 22, the work piece support tray 21 and the work piece collection shelf 23, capable to pick up the work pieces disposed in the work piece supply shelf 22 one by one and position the work pieces so picked up to the work piece support tray 21 to have the work piece marked by the laser beam and pick up the work piece that has been marked the laser beam and the convey the work piece so picked up to the work piece collection shelf 23 to have the work pieces collected therein. The construction of the carrier table 12 and the components thereof are disclosed in a co-pending application so that no further detail will be given herein.

Figure 5:
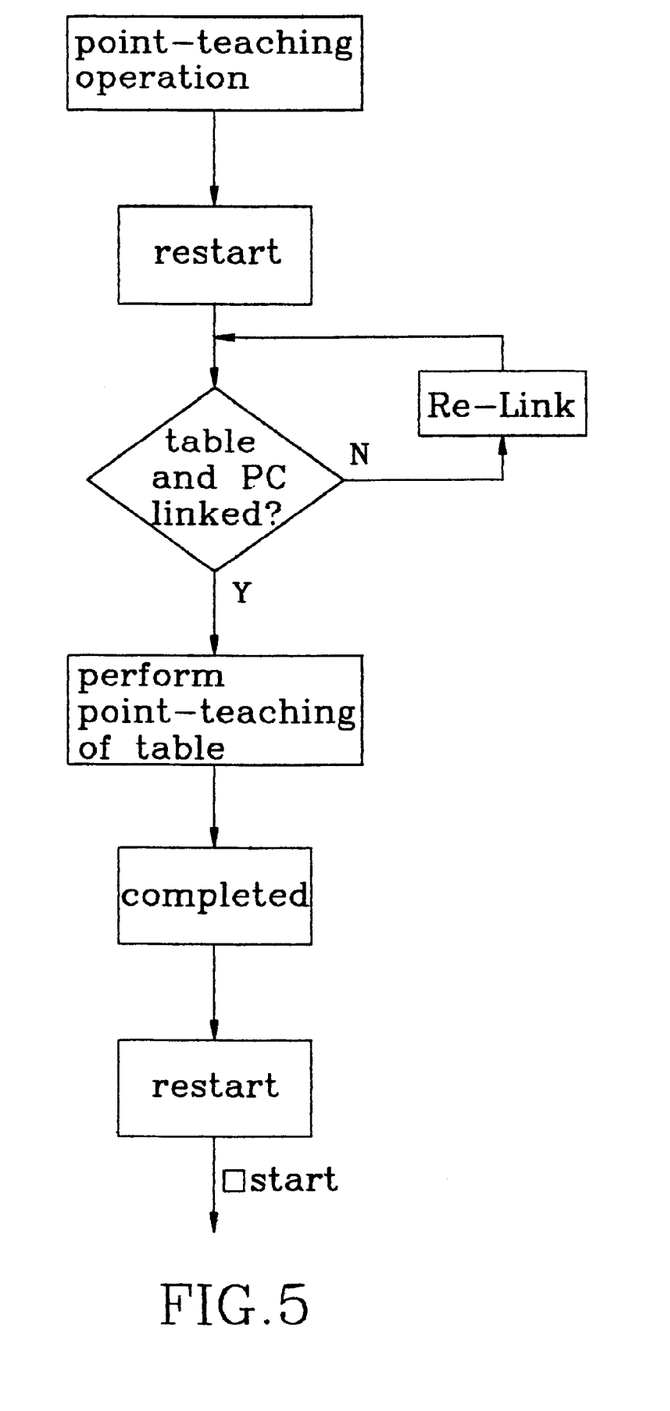
FIG. 5 is a flow chart showing the point-teaching operation of the control system of the present invention which is performed after the system starting sequence.
Figure 6:
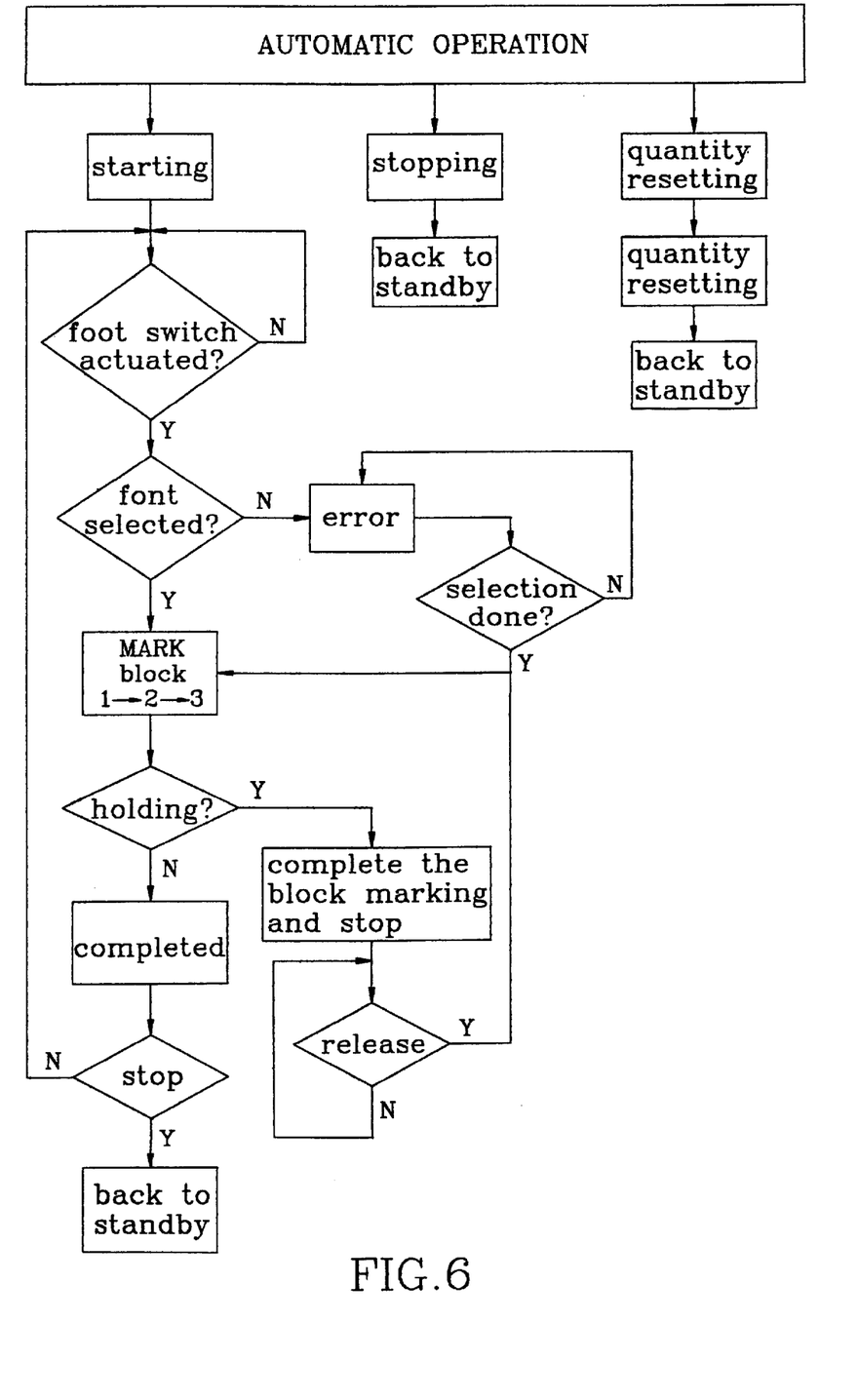
FIG. 6 is a flow chart showing the automatic operation of the control system of the present invention which is performed after the system starting sequence.

The operation of the marking control system of the present invention is controlled by control software pre-loaded in the PLC 11 to perform the marking operation on each of the work pieces via the carrier table 12. The man-machine interface 13 displays signals in response to the operation of the carrier table 12 of which the operation flow of the man-machine 13 is shown in FIGS. 3–6, wherein FIG. 3 shows system starting sequence, FIG. 4 shows manual operation process after the system is started, FIG. 5 shows the point-teaching operation after the system is started, FIG. 6 shows automatic operation process after the system is started.

Figure 3:
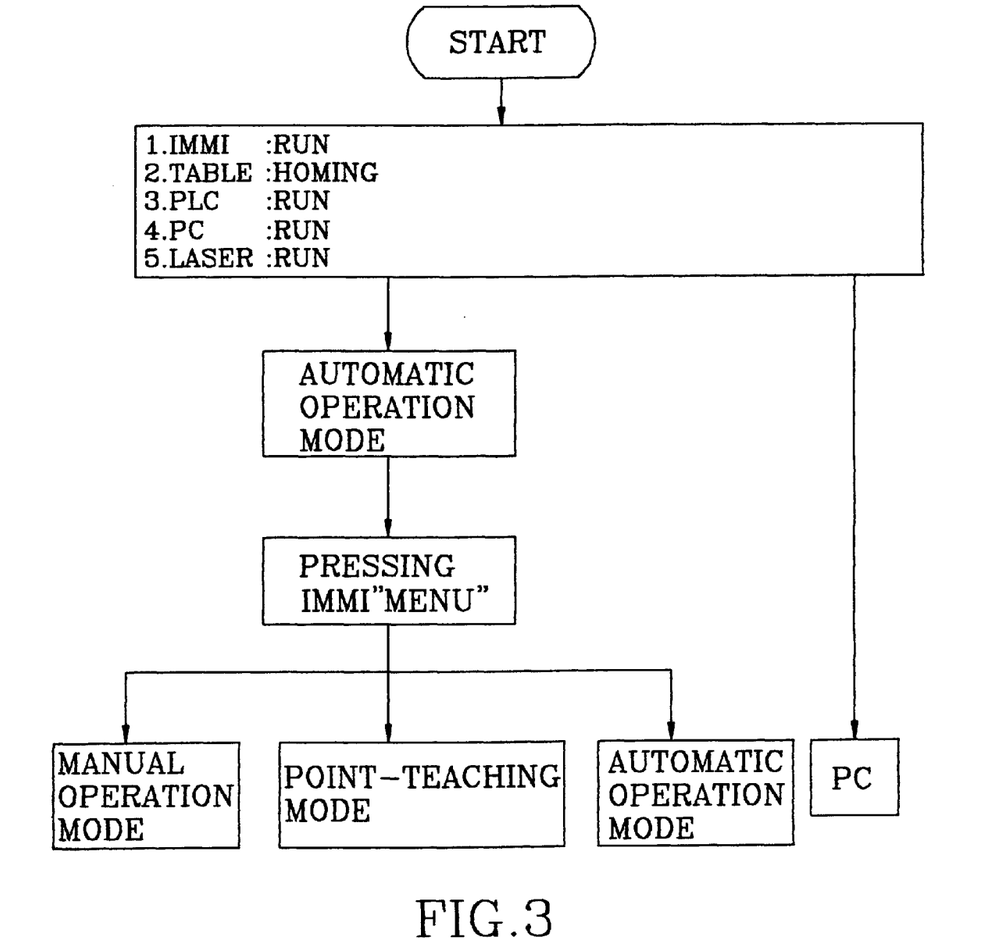
FIG. 3 is an example flow chart illustrating the system starting sequence of the marking control system in accordance with the present invention.

As shown in FIG. 3, the system starting sequence is as follows:

1. power on;
2. actuate the man-machine interface 13, home the carrier table 12; initialize the PLC 11, initialize the personal computer 10, actuate the laser device 14; at the moment, the personal computer 10 is in standby condition;
3. the system enters the automatic operation mode first to wait for operator's selection of the desired operation mode; and
4. select among the operation modes: "automatic operation", "point-teaching", "manual operation" via the man-machine interface 13.

Figure 4:
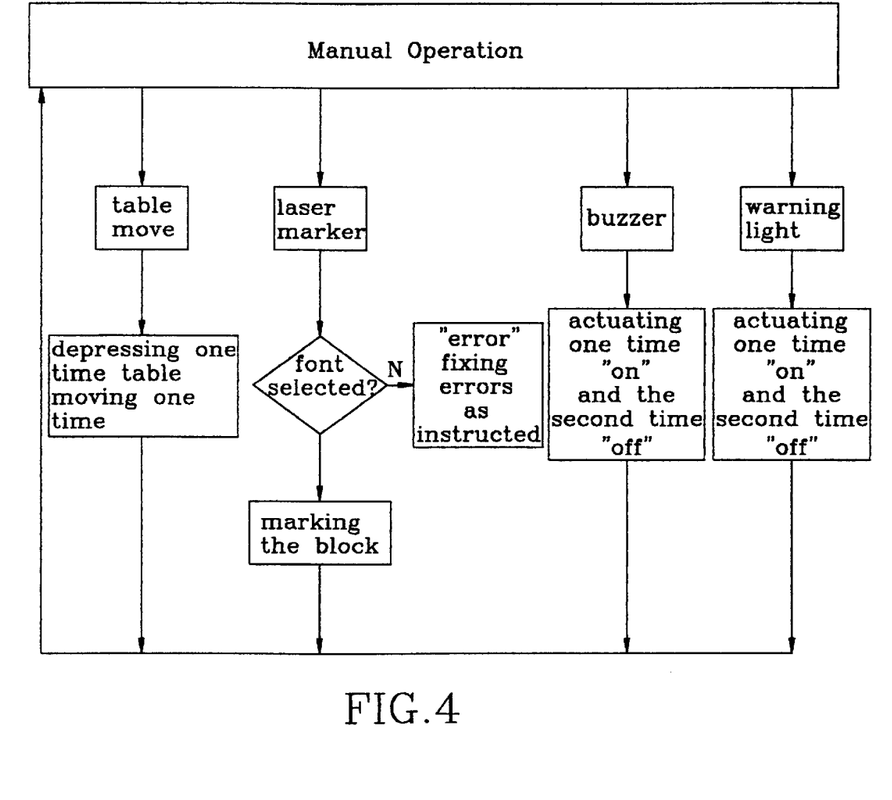
FIG. 4 is a flow chart showing the manual operation of the control system of the present invention which is performed after the system starting sequence.

When the "manual operation" mode is selected, as shown in FIG. 4, the process of the manual operation is as follows:

1. select the "manual operation" to enter the manual operation mode;
2. the carrier table 12, the laser device 14, the buzzer and the warning light are all in standby condition;
3. operator actuates the foot-control switch one time to input signal once which makes the carrier table 12 to move once;
4. check if a desired character/mark font is selected before the laser device 14 is energized to perform marking operation and if a font is selected, then perform the marking operation, otherwise generate a warning signal and the operate fixes the error as instructed;

5. the buzzer and the warning light are arranged to turn on as being actuated once and to turn off at the second time actuation; and 6. return to the manual operation mode standby condition.

For work pieces of different specifications, the "point-teaching" mode may be selected in which the operator manually operates the carrier table 12 with respect to the specification of the work piece first, while the PLC 11 using software to control the carrier table 12 learns and collects and stores related data in the computer 10. The PLC 11 may then use the collected data to perform an automatic marking operation on the work pieces of the particular specification.

When the "point-teaching" mode is selected, as shown in FIG. 5, the sequence of the "point-teaching" operation of the system is as follows:

1. select the "point-teaching" mode to enter the point-teaching operation;
2. system restarts;
3. system checks if the personal computer 10 and the carrier table 12 are linked and if they are, perform the point-teaching operation with the carrier table 12, otherwise re-link them;
4. the point-teaching operation of the carrier table 12 is completed and data are loaded into the system;
5. system restarts; and
6. return to the power on step.

When the "point-teaching" operation is completed, the system is capable to perform fully automatic marking operation on the work pieces of the particular specification. When the "automatic operation" mode is selected, as shown in FIG. 6, the operation sequence of the system is as follows:

1. select "automatic operation" mode to enter the automatic operation;
2. use the personal computer 10 to select among system starting, system stopping and resetting number of work pieces; the system starting option allows the system to enter next step; the system stopping option allows the system to go back to the standby condition of the automatic operation; resetting work piece number allows the system to reset the number of work piece to be marked and then go back to the standby condition of the automatic operation;
3. check if the foot control switch is actuated and if it is, go to the next step, otherwise repeat actuation of the foot control switch;
4. system checks if the personal computer 10 selects a character/mark font and if it is, go to the next step, otherwise generate a warning to inform the operator to make a selection of the font; after the font is successfully selected, the system enters the marking function or the system enters holding/releasing function;
5. in the marking function (stepwise operation), the system performs the marking operation;
6. in the holding/releasing function, if yes, holding the system after the current marking step is completed and if no, it indicates the system has completed the marking operation; and
7. in the stop function, if yes, go back to the standby status and if no, go back to the foot control switch.

Figure 7:
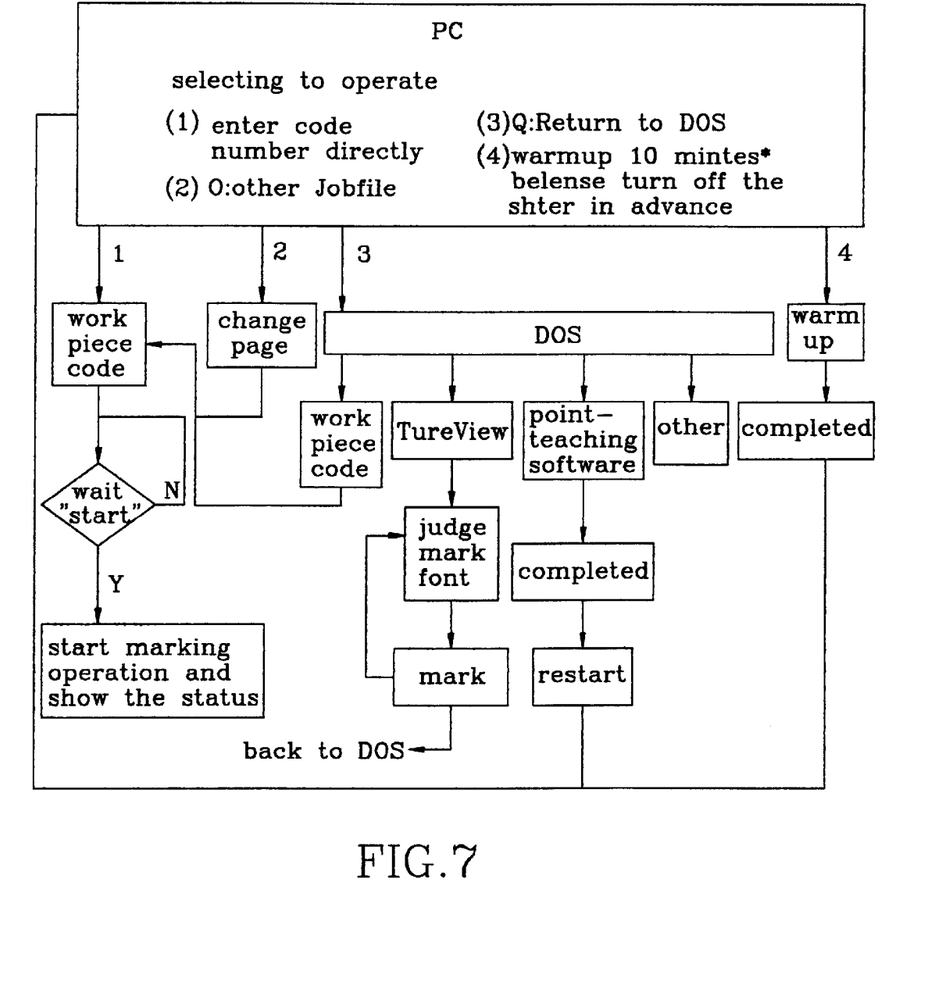
FIG. 7 is an example flow chart showing the operation of the personal computer adapted in the control system of the present invention.

In the operation of the system, the personal computer 10 performs an operation having a flow chart is shown in FIG. 7. This flow chart is designed to be operated in a text based operating system, such as DOS. In an actual operation, it may also be operated in other computer operation systems, such as an operating system using a graphical interface like WINDOWS.

As shown in FIG. 7, work pieces of rent specifications are put in the "point-teaching" mode to have the related data coded and stored in the personal computer 10 and thus, the operator may enter the desired code in accordance with the specification of a particular work piece to conveniently use the computer 10 to control the system. As shown, the specifications of the work pieces may be arranged as a number of pages of menus in the DOS environment and selection made among the menus allows the system wait to start to run. The operation status may also be displayed during the marking operation. Once a marking operation is completed, depressing the ESC key allows the system to go back to the standby condition, waiting for the next selection so that the system may be controlled to repeat the marking operations on work pieces.

During the operation of the control system in accordance with the present invention, if errors are detected by the system, then a warning is given via the buzzer and the warning light to inform the operator to fix the errors. By means of the "point-teaching" process, work pieces of different specifications may be efficiently marked by the system and have the marked products standardized and unified so as to significantly improve the quality thereof.

A marking work station incorporating the control system in accordance with the present invention may allow the marking operation to be controlled in a very precise and almost error free manner. The work station may be operated 24 hours every day. With this control system, the operator does not need to bring a work piece close to the laser device so that personnel physical protection is enhanced. A single operator is capable to monitor the operation of the work station and thus human labor is greatly cut down and the efficiency of the engraving operation highly increased.

The above description is made with respect to the preferred embodiment of the present invention and for those skilled in the art, it is possible to made a variety of modifications and changes to the above-described embodiment without departing from the scope and spirit of the present invention. All these modifications and changes should be considered within the scope of the present invention as defined in the appended claims.

What is claimed is:

1. A laser marker control system comprising:

a personal computer for selectively entering one of an automatic operation mode, a point-teaching mode, and a manual operation mode;

a programmable logic control coupled to the personal computer, the programmable logic control performing numerical calculations, signal input, status output and control of the carrier table;

a carrier table coupled to the programmable logic control and linkable to the personal computer in the point-teaching mode, the carrier table serving as a carrier of work pieces to me marked, the carrier table including a grasping device, a work piece support tray, a work piece supply shelf and a work piece collection shelf, and a buzzer and a warning light mounted at suitable locations on the carrier table, the carrier table being controlled by the programmable logic control to have the grasping device move between the work piece supply shelf, the work piece support tray and the work piece collection shelf for picking up, in a one by one fashion, work pieces that are disposed on the work piece supply shelf and at the same time, pick up an already marked work piece that is on the work piece support tray and move the marked work piece to the work piece collection shelf, errors encountered in the system being indicated by the buzzer and the warning light to inform an operator to fix the errors;

an industrial man-machine interface coupled to the programmable logic control and linkable to the programmable logic control for exchange signals, data and status, the man-machine interface including a touch-control monitor for display of status and indirectly controls the carrier table when linked to the programmable logic control; and, a laser device linked to the personal computer and generating a laser beam projected toward a work piece to perform a predetermined marking operation, the laser device being linkable to the carrier table in the point-teaching mode.

2. The laser marker control system as claimed in claim 1, wherein a starting sequence of the system is:

(a) powering on;

(b) actuating the man-machine interface, homing the carrier table; initializing the PLC, initializing the personal computer, actuating the laser device; at the moment, the personal computer 10 being in standby condition;

(c) the system entering the automatic operation mode first to wait for operator's selection of desired operation mode;

(d) selecting among the operation modes: "automatic operation", "point-teaching", "manual operation" via the man-machine interface.

3. The laser marker control system as claimed in claim 1, wherein the manual operation is as follows:

(A) selecting the "manual operation" to enter the manual operation mode;

(B) the carrier table, the laser device, the buzzer and the warning light being all in standby condition;

(C) operator actuating a foot-control switch one time to input signal once which makes the carrier table to move once;

(D) checking if a desired character/mark font is selected before the laser device is energized to perform the marking operation and if a font is selected, then perform the marking operation, otherwise generating a warning signal and the operate fixing the error as instructed;

(E) the buzzer and the warning light being arranged to turn on as being actuated once and to turn off at the second time actuation; and (F) returning to manual operation mode standby condition.

4. The laser marker control system as claimed in claim 1, wherein the point-teaching operation is as follows:

(i) selecting the "point-teaching" mode to enter the point-teaching operation;

(ii) system restarting;

(iii) system checking if the personal computer and the carrier table are linked and if they are, performing the point-teaching operation with the carrier table, otherwise re-linking them;

(iv) the point-teaching operation of the carrier table being completed and data being loaded into the system;

(v) system restarting; and (vi) returning to the power on step.

5. The laser marker control system as claimed in claim 1, wherein the automatic operation is as follows:

(I) selecting "automatic operation" mode to enter the automatic operation;

(II) using the personal computer to select among system starting, system stopping and resetting number of work pieces; the system starting option allowing the system to enter next step; the system stopping option allowing the system to go back to the standby condition of the automatic operation; resetting work piece number allowing the system to reset the number of work piece to be marked and then go back to the standby condition of the automatic operation;

(III) checking if the foot control switch is actuated and if it is, going to the next step, otherwise repeating actuation of the foot control switch;

(IV) system checking if the personal computer selects a character/mark font and if it is, going to the next step, otherwise generating a warning to inform the operator to make a selection of the font; after the font is successfully selected, the system entering the marking function or the system entering holding/releasing function;

(V) in the marking function (stepwise operation), the system performing the marking operation;

(VI) in the holding/releasing function, if yes, holding the system after the current marking step being completed and if no, it indicating that the system has completed the marking operation; and (VII) in the stop function, if yes, going back to the standby status and if no, going back to the foot control switch.

* * * * *